US008264934B2

(12) United States Patent
Waites (10) Patent No.: US 8,264,934 B2
(45) Date of Patent: Sep. 11, 2012

(54) MULTITRACK RECORDING USING MULTIPLE DIGITAL ELECTRONIC DEVICES

(75) Inventor: Nigel Waites, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 1445 days.

(21) Appl. No.: 11/724,749

(22) Filed: Mar. 16, 2007

(65) Prior Publication Data

US 2008/0225651 A1  Sep. 18, 2008

(51) Int. Cl.
*G11B 3/64* (2006.01)
*G06F 15/16* (2006.01)

(52) U.S. Cl. ............... 369/84; 709/208; 386/285

(58) Field of Classification Search .......... 386/239–241, 386/248, 278, 279, 285–287; 369/84; 709/201, 709/208, 217; 84/601; 381/1, 119; 713/400; 715/202, 255
See application file for complete search history.

(56) References Cited

U.S. PATENT DOCUMENTS

| 5,467,288 | A | * | 11/1995 | Fasciano et al. ............... 715/716 |
| 5,740,146 | A | * | 4/1998 | Webster ........................ 369/107 |
| 7,277,692 | B1 | * | 10/2007 | Jones et al. ................ 455/412.1 |
| 2002/0065570 | A1 | | 5/2002 | Fujita et al. |
| 2004/0136549 | A1 | * | 7/2004 | Pennock et al. ............... 381/119 |
| 2004/0249489 | A1 | | 12/2004 | Dick |
| 2006/0209174 | A1 | | 9/2006 | Isaac et al. |
| 2006/0254407 | A1 | * | 11/2006 | Jarrett et al. ................... 84/601 |
| 2007/0043804 | A1 | * | 2/2007 | Fibaek ........................... 709/201 |
| 2008/0271592 | A1 | * | 11/2008 | Beckford ........................ 84/645 |
| 2009/0204843 | A1 | * | 8/2009 | Celinski et al. ............... 713/400 |

OTHER PUBLICATIONS

International Search Report and Written Opinion, PCT/US08/02860, dated Jul. 2, 2008.

* cited by examiner

*Primary Examiner* — Thai Tran
*Assistant Examiner* — Mishawn Dunn
(74) *Attorney, Agent, or Firm* — Beck & Tysver, PLLC (57) ABSTRACT

The present invention is a method and apparatus for multitrack recording of audio information using handheld digital electronic devices such as suitably equipped portable digital music players. Recording of video tracks by digital electronic devices to complement the audio is also contemplated. One device serves as a master; the remainder are slaves. A key aspect of the invention is the transmission of start and stop recording signals by the master, which facilitates synchronization of the various tracks. In certain embodiments of the invention, some slaves may begin preliminary sampling of audio information prior to the start recording signal. This prepares these slaves to begin the actual track recording without delay. Upon receiving the command to start recording, each slave chooses as the first frame of its, say, audio track that sample closest to the time the signal to record was received. The task of stopping recording is typically handled similarly. A recording device may store an indicator whereby the time offset of its first frame from the start recording signal can be determined, thus facilitating time interpolation of the samples in its track. In this way, all audio tracks, for example, might be transformed to a common set of time points. In a typical configuration, the master might also record a sound track or a video track.

38 Claims, 3 Drawing Sheets

MULTITRACK RECORDING USING MULTIPLE DIGITAL ELECTRONIC DEVICES

FIELD OF THE INVENTION

The present invention relates generally to recording of audio and audio-video information. More specifically it is directed to a method and apparatus for recording and synchronizing tracks for a multitrack recording, where a plurality of digital electronic devices each record an individual audio track, video track, or both.

BACKGROUND OF THE INVENTION

Although most equipment for playback of sound is two-track stereo, there is a trend toward separately recording several or many tracks, and then subsequently reducing them to two tracks. For example, in recording a piano trio performance, each instrument (e.g., piano, violin, and cello) might be separately recorded through its own microphone.

When two or more audio tracks are recorded, accurate time synchronization among the tracks is essential because the human ear is very sensitive to track misalignment. Consequently, it is convenient to record the multiple tracks onto a single device that guarantees synchronization by handling all tracks uniformly. Each of the three most popular existing technologies—namely, analog multitrack recording to tape; digital multitrack recording to tape; and digital multitrack recording to a computer hard disk—employs this approach.

Such technologies require specialized equipment. In the cases of analog or digital multitrack tape recording, specialized hardware recording equipment is required. Because such specialized equipment has only one use, it is not cost effective for most nonprofessionals to own it. Recording to a computer hard drive requires specialized software. If all tracks are to be recorded at a live event or recording session, each technology requires a separate one-per-track input port or input connection to receive audio information taken from each microphone or other device. The specialized nature and high cost of the three current multitrack recording technologies set a barrier to small groups wanting to produce their own multitrack recordings, especially if synchronized video recording is also to be done. That is unfortunate because new opportunities abound for expression on the Internet through online presentation of audio-visual material.

SUMMARY OF THE INVENTION

The inventor recognized that the requirement for highly specialized and, in many cases, expensive equipment to produce a multitrack audio recording might be eliminated by incorporating a relatively modest modification into certain handheld digital electronic devices (DEDs). One class of handheld DEDs appropriate for this purpose is the relatively ubiquitous portable digital audio player, for example, an MP3 player. Other devices suitable for such an adaptation include, among others, personal digital assistants, cell phones, portable entertainment centers, digital cameras, and camcorders.

The central idea of the invention is that such virtually any type of handheld DED, if suitably equipped, could record a single audio track (and perhaps also a video track) to an internal digital storage medium. Two or more handheld DEDs, each recording a single track, can create a multitrack audio recording. Of course, additional non-handheld DEDs can supplement the handheld devices by recording additional tracks, within the scope of the invention. The storage medium could be hard disk, tape, CD, DVD or even random access memory; in fact, any storage medium upon which digital information can be recorded is within the scope of the invention. The individual tracks can be synchronized to form a multitrack audio recording.

Standard portable digital audio players already contain hard drives to which an individual track might be digitally recorded. Such devices have an additional advantage particularly in the context of recording music played by a small band. It would not be unlikely that each player in the band already owns a portable MP3 player for listening to favorite music, implying that the band might require no additional equipment to do multitrack recording if their MP3 players were adapted to provide the functionality of the invention. In contrast to current technologies that require specialized and sophisticated equipment to be available and present before recording can begin, the flexibility provided by the invention to spontaneously, even impulsively, create a multitrack recording will encourage creativity.

It is not uncommon for other classes of handheld DEDs to include digital storage. For example, cell phones often store digital photographs or music, although the amount of storage available in a cell phone is typically less than that of a portable digital music player. In any case, the skill to incorporate sufficient digital storage for the purpose of the present invention into virtually any class of handheld DED is possessed by ordinary practitioners in the art of consumer electronics design. Such digital storage can be used to record audio or video data.

In addition to storage capability, each handheld DED to be used in a sound recording session must be equipped to receive audio input, either sound recorded in real-time from a live performance or event, or sound that was previously recorded and stored. To record sound in real-time, the handheld DED must contain either an integrated (i.e., internal or permanently attached) microphone or a connector adapted for receiving input from an external microphone. It is advantageous for a device to have both capabilities because an integrated microphone will be more convenient and always readily available, while an external microphone can be specialized and provide much higher fidelity.

Often separate voice or music tracks are incrementally added to produce a final composite recorded product. A vocalist might record lyrics while listening to a prerecorded soundtrack through a headset. In such cases, recorded output from a previous session must be input to the current one. A connector can be provided in the handheld DED to accommodate such prerecorded input. This connector might be of the same type as the external microphone connector, or the connector might be of a different type. A handheld DED can be equipped with all these input mechanisms (integrated microphone, external microphone connector, connector for other external electronic device), or others, all within the scope of the invention.

As mentioned previously, the advantage in prior art methods of recording all audio tracks simultaneously into a single device is that synchronization of the separate tracks is easy. Contrasting with the prior art multitrack recording system, in the present invention individual tracks are recorded by separate handheld DEDs. Therefore, a key aspect of the present invention is a system for synchronizing the separate sound tracks. The invention solves the synchronization problem by establishing one handheld DED as a master and the remaining ones as slaves. More specifically, these slaves will be referred to as audio slaves, to distinguish them from video slaves that may also participate in the apparatus and method of the invention. Establishing a device as the master or as an audio slave will usually occur through user controls of the device. Upon designation of a particular device to be an audio slave, it preferably begins audio sampling. Sampling by the audio recording devices will be at a given uniform rate. Persons of ordinary skill in the art can, with existing technology, configure the time interval between samples so accurately that, for purposes of a sound recording of several hours, all the devices are sampling sound at an identical rate. While the sampling intervals are the same, between any two devices the absolute times at which samples are taken will, in general, be different.

Synchronization of tracks is achieved by the master device sending signals that are received by the audio slaves. When the master receives a command through its user interface to begin recording, the master transmits a corresponding signal to the audio slaves. The transmission will preferably be wireless, but wired connection of the master to some or all of the audio slaves is also possible. Each audio slave chooses the sample, or audio frame, closest to the time the broadcast was made. At worst, samples taken by any given audio slave will be displaced in time by one-half sampling interval. By choosing a sufficiently high sampling rate (or, equivalently, a sufficiently small sampling interval), the discrepancy from perfect synchronization can be reduced to the point where it is not noticeable to the most demanding audiophile.

More exact synchronization can be achieved if an audio recording device saves to electronic storage the offset of its first frame from the signal to start recording. Equivalently, the device might save another indicator of offset such as the absolute time of its first frame; in this case, the master would save to electronic storage the absolute time when it sent the start recording signal to facilitate calculation of the offset. The offset indicator might be stored with the track or separately. With this information, postprocessing using hardware or software logic can be used to interpolate the set of audio samples composing a track to a constructed set of samples at different times. In this way, each track can be transformed to a single set of time points, presumably corresponding to the time of the start recording signal. If such interpolated is anticipated, then the first frame of the track will preferably be chosen to the one at or immediately before the start recording signal.

By starting the audio slaves in advance of a signal to begin recording the actual audio tracks, whatever time is necessary to spin up hardware and software in the audio slaves does not adversely affect the synchronization. After designation as an audio slave, the device can record frames to a circular buffer, possibly for quite a long period, while it waits for the signal from the master to begin recording its actual audio track.

The process for ending the recording is similar to that for starting the recording. The master is commanded to stop through its user interface, then it transmits a corresponding signal to the audio slaves. Logic within each in the recording. It might be necessary for the audio slave to record an additional frame after it receives the signal to ensure that the last frame is at most one-half sampling interval out of perfect synchronization. If interpolation through postprocessing is anticipated, then the last frame will preferably be the one at or immediately after the stop recording signal.

In some embodiments, one or more DEDs complement the multitrack audio with video information, synchronizing with the audio using the start and stop recording signals from the master. A video recording device will either be the master itself or a video slave of the master. The master might record a video track even if it does not record audio. Many current devices are equipped to record a digital video stream, including camcorders, some cell phones, personal computers with webcams, and to a limited extent, some digital still-frame cameras. It is within the ordinary skill in the consumer electronics art to incorporate digital video recording functionality in response to a signal from a remote master in the design of an electronic DED.

A number of possibilities exist for which devices record video tracks within the scope of embodiments of the invention. A video slave need not be handheld. For example, a large camcorder mounted on a tripod that records in response to signals from the master is a contemplated embodiment. On the other hand, a handheld DED audio slave or the master might also record a video track.

Many of the concepts already discussed regarding audio slaves also apply to video slaves. The video slave must be able to record the information onto a digital storage medium; the storage might be internal like that for an audio track recorded by an audio slave, but it could be external.

A video slave can include an internal optical sensor (i.e., a video camera), a connection to an external camera, or it can include an adapter that receives video input, either real time or prerecorded, from an external source other than a camera. External video input from a camera or other source can be wired or wireless. The video sensor or adapter may complement various audio input features of the device.

As with audio slaves, establishing a device as a video slave will occur through user controls of the device. A video slave might begin sampling immediately upon its establishment as such. While immediate video sampling is advantageous for video slaves (or the master) for the same reasons as for audio, it is not essential to embodiments of the invention that include video. Video information is recorded at a constant rate with a video device. There need not, however, be a single rate that is uniform across the video devices. Generally, the video sampling rates are likely to be different from the uniform audio sampling rate.

In embodiments in which video sampling begins upon establishment of a device as the master or as a video slave, buffering and synchronization can use the same process as for the audio tracks. If so, then the first and last frame of the video tracks will also each be preferably chosen to be at most one-half of the sampling interval of the video recording device out of perfect synchronization. In any case, the video slaves will respond to signals received from the master to start and stop recording.

Although a set of video frames composing a video track can be interpolated to correct for a synchronization offset, the logic required is substantially more difficult than for the audio interpolation already discussed. If such interpolation is anticipated, however, the offset from the start recording signal, or some equivalent indicator of offset such as the time of the first frame, should be stored either with the track or elsewhere. In this case, the first frame or sample will preferably be chosen to be one at or immediately before the start recording signal. Analogously, the last frame will preferably be one at or immediately after the stop recording signal.

Preferably, the master will also record its own audio track, but in other embodiments it will not. In some embodiments, the master device will not be aware that any slaves are listening for transmission of the signal to start and stop recording. In other embodiments, some indication will be given to the master of existence of the slaves to which it should transmit these signals. This indication might come from through a user interface, from a database, or from the slaves themselves.

During the processes just described, various commands are given by a user to the master and slave devices. These commands might be given through a graphical user interface on each device; through tangible controls integrated into the devices such as buttons, dials, and switches; or by wired or wireless transmission from another device. In fact, the command might be automatically generated without direct user control, for example by a signal from a computer generated by a scheduling program.

DETAILED DESCRIPTION OF THE INVENTION

The invention is a method and apparatus for producing a multitrack audio recording using two or more handheld digital electronic devices (DEDs) 100. One device will serve in the role of the master 105 and other devices will serve in the role of slave 110. In any embodiment of the invention, at least two handheld DEDs 100 will record audio tracks. Those two devices might be two audio slaves 111, or the master 105 and an audio slave 111.

In some embodiments of the invention, video tracks are also recorded. The master might record video. There could be one or more video slaves 112. A particular slave 110 might serve as an audio slave 111, a video slave 112, or both. A video slave 112 will also be a DED 100, but unless it is also an audio slave 111, will not necessarily be handheld. A key role of the master 105 is to synchronize timing of a plurality of recorded tracks, whether audio or video.

Figure 1:
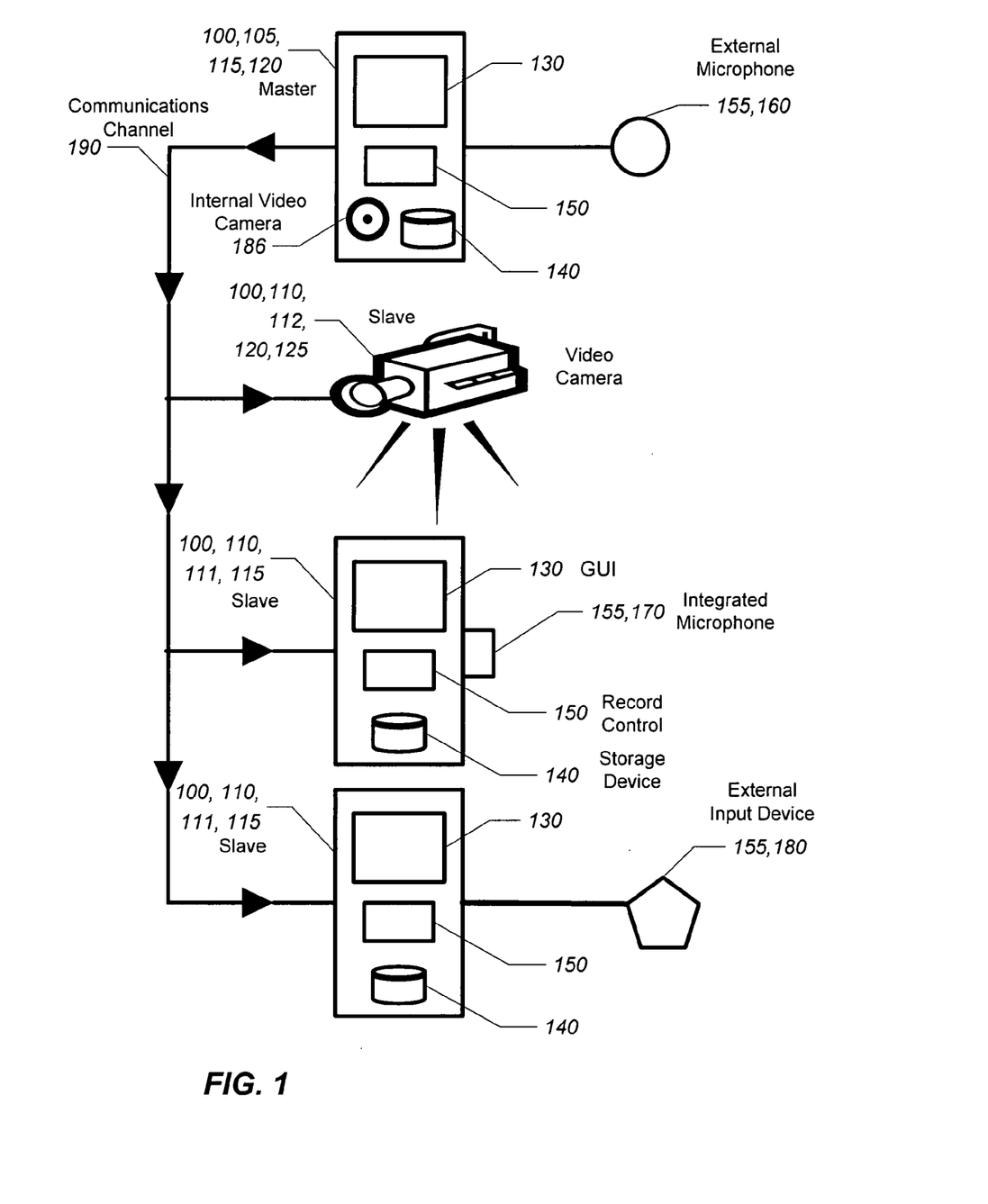
FIG. 1 is a block diagram showing the relationship between master and slave handheld digital electronic devices in an embodiment of the invention.

FIG. 1 is a block diagram illustrating one embodiment of the invention. The figure shows four recording devices, including a master 105 and three slave 110 devices. The master 105 and two audio slaves 111 are handheld DEDs 100 that are audio recording devices 115. The fourth device is a video recording device 120 that is a video slave 112, a video camera 125 mounted on a tripod. In the illustrated embodiment, the master 105 is also a video recording device 120.

As will be detailed below, the minimum functionality of the master 105 role differs from that of a audio slave 111. It is more flexible if all the handheld DEDs 100 used to produce a particular sound recording be equipped to handle either the role of master 105 or audio slave 111, as is the case in the illustrated embodiment. However, any two audio recording devices 115 that are synchronized by the master will do. As mentioned previously, this is satisfied by one audio slave 111 and a second audio recording device 115 that is either another audio slave 111 or a master 105 that records audio. Some embodiments also include one or more video recording devices 120.

Each audio slave 111 is adapted to receive an external input command that causes it to begin sampling audio information. That command can be given in any number of ways, including a transmission from an electronic device or by human manipulation of a tangible control. In the figure, each device has a graphical user interface (GUI) 130 and associated touch controls (e.g., buttons, scrollers, pointing devices, touch screen—not shown) whereby a user can command a device to begin sampling. Typically, the command establishing a device as an audio slave 111 or as the master will also serve as a command to the device to start audio sampling.

Each audio recording device 115 obtains audio information from an audio input source 155 external to the device. In FIG. 1, the master 105 is connected to an external microphone; the audio slave 111 labeled 126 has an internal microphone, and another audio slave 111, labeled 127, is connected to an external audio input device 180 upon which audio information has been previously recorded. Examples of an external audio input device 180 include a computer, a portable digital music player, or an analog or digital tape recorder. To handle input from an external audio input device 180, the audio recording device 115 has connector and internal logic in hardware or software to process the input. Many suitable communications technologies, both wired and wireless, are well-known in the art.

Sampling, whether audio or video, causes the recording device to save discrete frames, called samples into an integrated digital storage 140 medium. (In reference to storage, we will use the terms medium and apparatus interchangeably, although strictly speaking the medium (e.g., a compact disk) is contained in an apparatus (e.g., a compact disk drive) that controls and records upon the medium.) In the audio slaves 111 illustrated by the figure, the storage 140 medium is an internal hard disk drive. Other examples of digital recording media include, but are not limited to, CD, DVD, flash memory, random access memory, and tape.

When a command is received by an audio recording device 115 to begin collecting audio samples, the device begins storing preliminary samples until the signal to start recording its actual audio track has been sent. Any hardware and software necessary to the recording operation within the audio slave 111 is thereby spun up in advance, so each audio slave 111 can begin track recording without delay. In one embodiment of the invention, the preliminary samples, namely, those captured by the audio slave 111 before the signal to start recording the track arrives, are stored in a circular buffer. This circular buffer might be physically separate from that used for recording the track proper. More typically, however, there is a single storage area for both the preliminary samples and the actual track. In this case, the preliminary samples might be written to a portion of the storage area circularly. When the signal to record arrives, the audio recording device 115 just continues recording, but now linearly, simply adding onto the area where it has been recording circularly.

For a device to be a master 105 it must at least be adapted to receiving a command from an external source establishing it as a master 105 device; to receiving commands from an external or internal source to start and stop recording; and to transmitting signals to start and stop recording to the slaves 110 over a communications system 190. In FIG. 1, the command establishing a device as a master 105 is done by a human user through a GUI 130 and associated tangible controls (e.g., buttons, scrollers, pointing devices, touch screen—not shown). The device might also be adapted to receiving voice commands, another technology well-known to practitioners of the art. Any approach for sending the device a command from any external source is within the scope of the invention. Examples of the method of sending the command might be human manipulation of controls or wired or wireless transmission of a signal from a computer or from another DED 100, or an internal trigger generated by a timer. The master 105 also needs an approach to receive commands from an external source or internal trigger to start and stop recording tracks for the multitrack recording. In FIG. 1, that approach is the press of a record control 150 button by a user. There could be separate buttons for start and stop, and in fact, any of the example approaches already mentioned for giving the device a command from an external source will suffice. In the embodiment illustrated by the figure, two slaves 110 also each have a record control 150 button, which is unused on a device in the role of a slave 110.

It is the responsibility of the master 105 to transmit a corresponding signal to begin recording to the slaves 110 over a communications system 190. This signal applies to slaves 110 that record audio information as well as to ones that record video. Within the invention, it is not essential for the master 105 to receive any signals from the slaves 110. Consequently, communication is shown in the figure with arrows originating at the master 105 and going to the slaves 110. Obviously, any communications system 190 having two-way communication capability between the master 105 and one or more of the slaves 110 satisfies the requirement for one-way (master 105 to slave 110) communication and is still within the invention. The preferred mode of communication is by wireless broadcast, in effect a publication by the master 105 wherein the master 105 is unaware of whether any slaves 110 are listening for the broadcast. Devices enabled as slaves 110 and within range of the broadcast each begin recording their respective actual track or tracks upon receipt of that broadcast. In the embodiment illustrated by FIG. 1, once a user (or users) has established the devices as the master 105 and slaves 110 (in the case of the two handheld DEDs 100, through their respective GUIs 130), a user presses the record control 150 button of the master 105. The master 105 must then signal the slaves 110 to start recording their respective tracks.

In a common embodiment of the invention, the master 105 and all the slaves 110 are physically located in close proximity to each other within the same room. Consequently, whether the signal from the master 105 to the slaves 110 to start recording is sent by hard wire or by wireless transmission, the signal travels at the speed of light and, for all practical purposes, the slaves 110 receive the signal essentially simultaneously with the time the master 105 transmits it. In other embodiments, there may be a nontrivial time delay between sending of the start recording signal and its receipt by a particular slave 110; and similarly, for the end recording signal. In such cases the slave 110 will include logic in hardware or software to adjust its estimate of the difference. Such logic will require that the slave 110 be provided with parameters to facilitate the calculation, such as the lag itself, or a distance to the master and a lag per unit distance. These parameters might be provided to the slave 110 through a GUI 130; other parameters, such as a conversion factor between distance and time lag, might be hard coded in software of the device. Henceforth, the term "estimated time" or "time estimate" will refer to an actual time or an adjusted time, as the case may be.

Audio and video samples recorded by a given device are equally spaced in time. In other words, the sampling rate for a particular track is constant. Each audio recording device 115 is configured to sample audio information at the same rate. In other words, the audio sampling rate of track recording is uniform across all the audio recording devices 115. A video recording device 120 may record video information at a different sampling rate from the uniform audio rate, and two video recording devices 120 may record at rates different from each other, all within the scope of the invention.

Although the audio recording devices 115 sample at a uniform rate, the equally-spaced samples the recording devices collect might be offset in time relative to each other. For example, the start track recording signal might arrive at one slave 110 at the beginning of sampling interval; at a second, in the middle; and at a third, toward the end. Each audio recording device 115, therefore, contains logic (software or hardware) to select the first sample of the recording. Preferably, this sample will be chosen to be one such that no other sample is closer in time to the start recording signal. In this way, the sample selected by each recording device will be within one-half sampling interval of the time of the start recording track signal. No two audio recording devices 115 will be more than one full time interval apart in their initial samples. If the master 105 will also record, then the master 105 will preferably transmit the start recording signal to coincide with the time of one of its samples, so that its logic to select a first track sample is trivial. The length of the sampling interval determines how accurately synchronized the recording devices will be.

Storage of some indicator of the time offset between the first sample recorded by a particular audio recording device 115 and the start recording signal will allow postprocessing of the track, interpolating to produce a set of constructed samples at ideal times. Presumably, the ideal time of the first constructed sample will correspond to the start recording signal, with subsequent constructed samples being equally spaced at the sampling interval. Using this approach, all audio tracks can be transformed to a uniform set of time points. If interpolation is anticipated, it is preferable for the first recorded sample of the track to be one at or immediately before the start recording signal, and for the last recorded sample of the track to be one at or immediately after the stop recording signal. Interpolation can be applied to a sequence of video frames, but because video interpolation is significantly more difficult than audio interpolation, it is less likely to be used. In principle at least, the discussion in this paragraph of interpolation of audio samples also applies to video samples.

Conceivably, the recording devices might sample more frequently during the preliminary sampling period than during recording of the actual track. This approach facilitates more accurate synchronization without sampling of the track recording itself having excessive density. In this case, the devices will have a constant sampling rate before, and a different constant sampling rate after, the start of actual track recording.

In some embodiments, it is conceivable that transmission lag differences might cause the slaves 110 to receive the start recording signal (and, similarly, the stop recording signal) at different times. In such situations, to compensate for this effect, the start recording signal can include a timestamp. Logic in the slaves 110 can then use the timestamp to determine which sample was captured closest to that time for use as the first sample of the track recording. In this case, each slave must have an accurate clock or other accurate time source.

In the typical embodiment of the invention shown in FIG. 1, the master 105 device will also record audio information. Like the audio slave 111 devices, there may be some time required for hardware or software within the master 105 to spin up in order that it may begin recording without delay. If the master 105 also records a track, it must therefore be given a trigger from an external source to start preliminary sampling. In the embodiment of the figure, the same user command, entered through the GUI 130, that establishes a device as the master 105 causes that device to start preliminary sampling of audio information. The master 105 may handle its own recording of video information analogously using preliminary sampling.

Recording stops in task flow analogous to that for the start of recording. First, the master 105 receives a command from an external source to stop recording by, for example, a button press by a user. The master 105 then broadcasts a signal over the communications system 190 to stop track recording. That signal is received by the audio slaves 111. The audio slaves 111 (and the master 105 if it is also recording an audio track)

apply logic to select the last sample of the recording. As has already been discussed, which sample is selected may depend on whether interpolation of the samples to a uniform set of reference time points is anticipated.

As mentioned previously, in some embodiments of the invention one or more video tracks are recorded in addition to the two or more audio tracks. A video slave 112 has much in common with an audio slaves 111, but there are some possible differences as well. For example, a video slave 112 need not be handheld. A single device can be both an audio slave 111 and a video slave 112. The role of the master 105 in synchronizing video tracks with the audio tracks and with each other is essentially the same as its role for a purely audio multitrack recording. The master 105 can optionally record video.

A video recording device 120 samples video information from an external source. In FIG. 1, the master 105 has a built-in video camera. The tripod-mounted video camera 125 shown in the figure is an example of a video slave 112. A device might also have one or more connectors or jacks (not shown) from which it receives video information from an external source, either prerecorded or being recorded in real time along with one or more audio tracks. A video recording device 120 either has internal electronic storage or can access such storage externally.

Like an audio slave 111, a video recording device 120 responds to a command establishing it as a video slave 112. This command will be given through some kind of user interface (such as a GUI 130 or user touch or voice controls), but it could also be transmitted either by wired or wireless means. In some embodiments of the invention, a video recording device 120 may require a command to start sampling. The command establishing the device as master 105 or as a video slave 112 might serve this purpose. Some embodiments of the invention include capturing of video information by the master 105 or by a video slave 112 in a circular buffer in a manner analogous to that described for preliminary audio sampling. The advantages of this approach in the video context are the same as for recording audio tracks. In particular, the device can be adapted with hardware or software logic to choose initial and final track frames that are at most one-half video sampling interval away from the time of transmission of the start and stop recording signals, respectively. As already discussed, the choice of initial and final track frames will be affected by whether time interpolation of frames is anticipated. Regardless of whether preliminary video samples are captured, a video slave 112 responds to the signals from the master 105 to start and stop recording.

Figure 2:
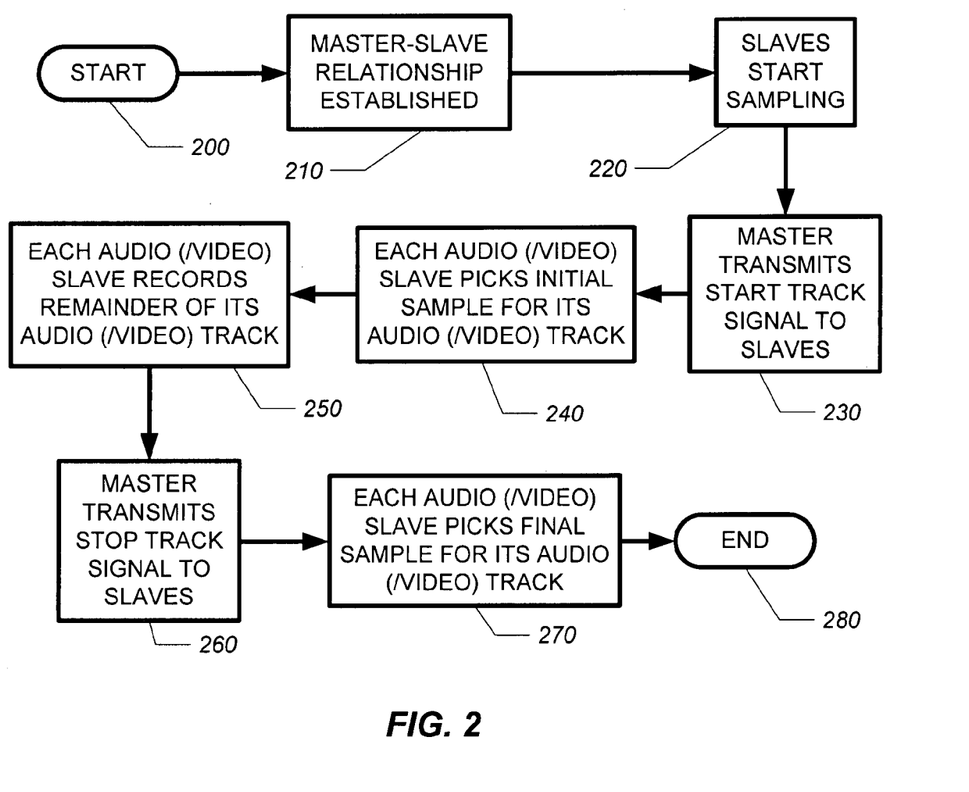
FIG. 2 is a flowchart showing the process of synchronization between the master device and the slave devices in an embodiment of the invention.

FIG. 2 is a flowchart illustrating the process of the invention, starting from the node labeled 200, for an embodiment in which there are two or more slaves 110. Initially, one device is instructed to be the master 105. Other DEDs 100 are instructed to behave as slaves 110. A particular device can be established as an audio slave 111, a video slave 112, or both. Thus, the master-slave relationship is established 210. At least two devices will be audio recording devices 115. There may be one or more video recording devices 120. The master 105 might be an audio recording device 115, a video recording device 120, or both. A video recording device 120 other than the master 105 will be a video slave 112. Upon receiving the instruction to act as an audio slave 111, a designated device starts 220 preliminary audio sampling. In the embodiment of the figure, it is assumed that a video slave 112 will also conduct 220 preliminary audio sampling. Samples are saved to electronic storage 140. The master 105 then transmits 230 a signal to the slaves 110 to start recording their respective tracks. Ordinarily, the master 105 will have itself received a trigger from an external source causing it to send the signal to start track recording, but in some embodiments the trigger might be internally generated within the master 105, possibly from scheduling software. Each slave 110 then picks 240 a sample to be the initial sample for its audio track, video track, or both. It then continues to record 250 the remainder of its track(s). The master 105 then sends 260 a signal to stop recording to the slaves 110. Each slave 110, upon receiving the stop signal, selects 270 a sample to be the final sample of the track or tracks it is recording. The process then ends 280. Subsequently, steps may be taken to synthesize the audio tracks into a two-track stereo recording. To produce a multitrack audio recording, the master 105 will necessarily record a track if there is a single audio slave 111, and might do so if there are two or more audio slaves 111. Video tracks might be spliced to produce an interesting composite, and integrated with the audio.

Figure 3:
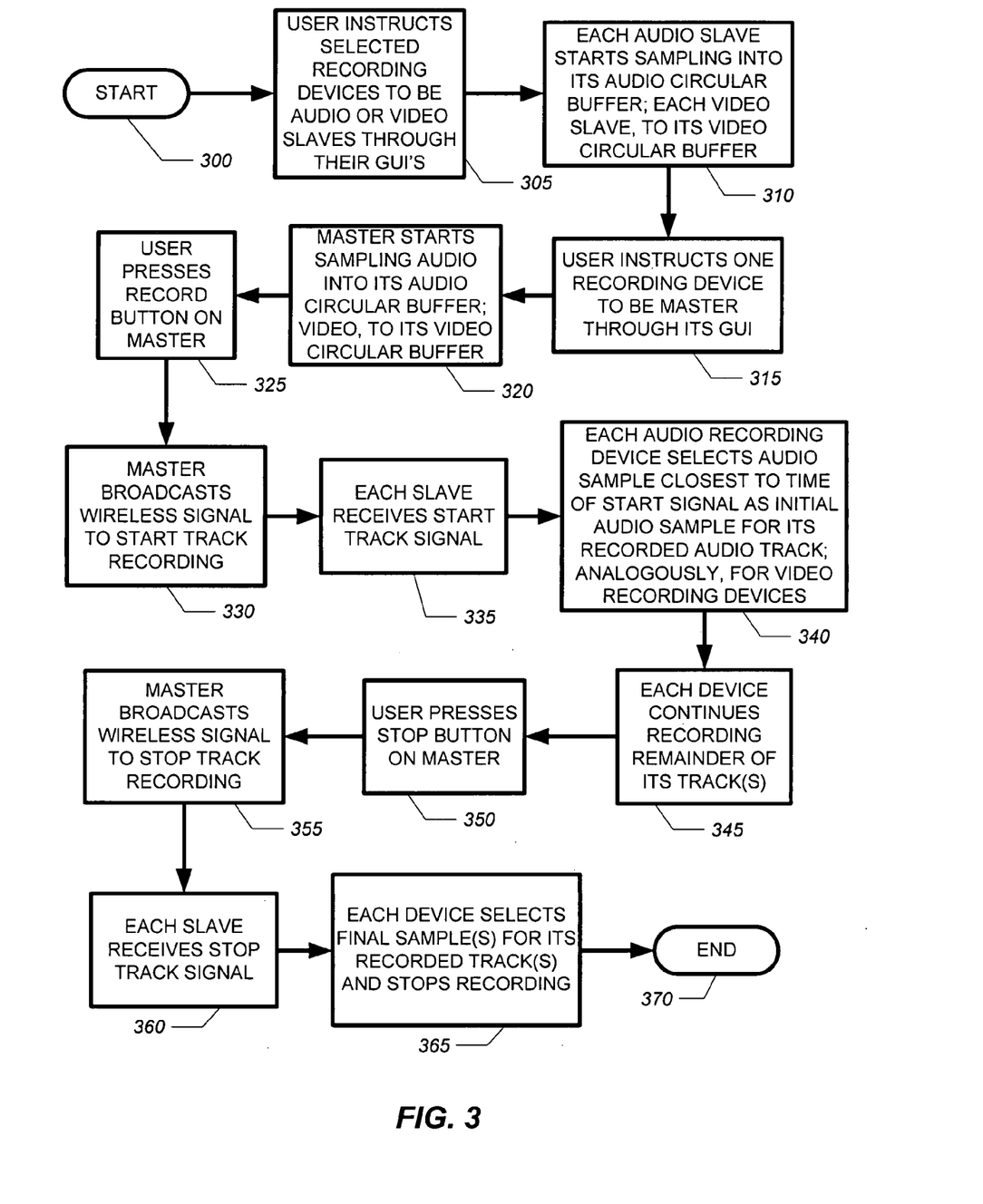
FIG. 3 is a flowchart showing more details of the synchronization process in another embodiment of the invention.

More details of a particular embodiment of the process of the invention are provided in the flowchart of FIG. 3. In this embodiment, it is again assumed that recording of all audio and video tracks includes circular buffering of preliminary samples. This embodiment also assumes that the master 105 is a recording device for audio, video, or both. At the start 300 of the process, the user instructs 305 one or more selected DEDs 100 to be slaves 110. This instruction is issued by a human user through a respective GUI 130 on each device using associated physical controls such as buttons, dials, or pointers and internal logic in software or hardware. Upon receiving the instruction to behave as a slave 110, a device starts collecting 310 preliminary samples from its respective input source and placing those samples into a circular buffer on an internal storage 140 medium, such as a hard drive. Like the master 105, a particular slave 110 might record an audio track, a video track, or both. Through its GUI 130, another device is instructed 315 by a user to behave as the master 105. The master 105 then begins sampling 320 to its own circular buffer.

If a musical performance by a band were being recorded, at this point some setup might be required before each performer is prepared to play for the record. The devices would have been physically positioned in areas of the room or stage to collect sound from the different instruments, each on a separate track. One or more video cameras might be positioned around the room to capture the band as a whole, and perhaps individual performers such as soloists. These video cameras might also record audio tracks. When everyone is ready, one person would press 325 the record control 150 button on the master 105. The master 105 then broadcasts 330 wirelessly over the communications system 190 the signal to start track recording and any slaves 110 within range of the broadcast receive 335 the signal. Logic in each recording device is triggered that selects 340 one sample to serve as the start of the actual track recording. That sample will be the one that is closest in time to the time of broadcast of the start track signal; it will be offset by at most one-half the sampling interval. Samples are equally spaced in time. Each recording device continues to record 345 to storage 140, but now in a linear fashion for the actual track rather than a circularly as it did for the preliminary samples.

When the performance is finished, a user presses 350 a record control 150 button (which might be the same button as the one used to start the recording or another button) on the master 105 to indicate that recording should stop. The master 105 broadcasts 355 the signal to stop recording, which is received 360 by each slave 110 in range. Each recording device then picks 365 the final sample for its track (or tracks if the device is recording both audio and video) using the same approach as for the initial sample, ending 370 the process.

Throughout the specification and claims, the word "or" is used inclusively unless exclusive—or is clear from the context. For example, the phrase "logic in hardware or software" means logic in hardware only, in software only, or in some combination of hardware and software.

The present invention is not limited to all the above details, as modifications and variations may be made without departing from the intent or scope of the invention. For example, the functionality of the master could be handled by a computer or by a simple button control with wireless broadcast capability. Consequently, the invention should be limited only by the following claims and equivalent constructions.

What is claimed is:

1. A method for creating a multitrack recording, comprising:
    a) establishing a set of audio slaves that contains at least one handheld digital electronic device;
    b) establishing another handheld digital electronic device to be a master;
    c) establishing an audio recording set that contains at least two devices taken from a set that includes the master and the audio slaves;
    c) transmitting by the master a signal to collect samples;
    d) receiving the signal to collect samples by the audio slaves;
    e) collecting at a uniform constant sampling interval a respective sequence of audio samples by each device in the audio recording set;
    f) transmitting by the master a signal to start track recording;
    g) receiving the signal to start track recording by the audio slaves; and
    h) selecting by each device in the audio recording set a respective initial audio sample from its sequence of audio samples for an audio track corresponding to that device, the selection being based upon the time of transmitting the signal to start track recording.

2. The method of claim 1, further comprising:
    i) establishing a set of video slaves that contains zero or more digital electronic devices;
    j) establishing a video recording set that contains at least one element taken from a set that includes the master and the video slaves;
    k) receiving the signal to start track recording by the video slaves, if any; and
    n) recording a respective video track by each device in the video recording set, each such device selecting an initial frame for its video track based upon an estimate of the time of transmitting the signal to start track recording.

3. The method of claim 2, wherein the video recording set includes the master.

4. The method of claim 1, wherein the audio recording set includes two audio slaves.

5. The method of claim 4, wherein the audio recording set includes the master.

6. The method of claim 1, wherein each device in the audio recording set collects its sequence of audio samples from an integrated microphone, from an external microphone or from another external electronic device adapted to communication with that recording device.

7. The method of claim 1, further comprising:
    i) receiving by the master a command to transmit the signal to start track recording.

8. The method of claim 7, further comprising:
    j) receiving by the master a command to transmit a signal to stop track recording;
    k) transmitting by the master the signal to stop track recording and receiving the signal to stop track recording by the audio slaves; and
    l) selecting by each device in the audio recording set a respective final sample from its sequence of audio samples for an audio track corresponding to that device, the selection being based upon an estimate of the time of transmitting the signal to stop track recording, the track including all audio samples collected between the initial and the final sample of the track.

9. The method of claim 1, wherein establishing a handheld digital electronic device to be an audio slave is executed through a graphical user interface on that device, establishing a handheld digital electronic device to be the master is executed through a graphical user interface on that device, and the command to transmit the start audio track recording signal is issued to the master through a user record control on the master.

10. The method of claim 1, wherein the step of transmitting a signal to start audio track recording by the master is performed by a wireless broadcast.

11. The method of claim 1, wherein collecting a respective sequence of audio samples by a particular audio slave begins when a handheld digital electronic device is established to be the particular audio slave and wherein, if the master is in the audio recording set, collecting a respective sequence of audio samples by the master begins when a handheld digital electronic device is established to be the master.

12. The method of claim 11, wherein, in the step of collecting a respective sequence of audio samples by each device in the audio recording set, a particular device in the audio recording set utilizes circular buffering before the master transmits the signal to start audio track recording.

13. The method of claim 1, wherein at least one of the handheld digital electronic devices is a portable digital audio player.

14. The method of claim 1, wherein the respective initial audio sample is selected to be a sample in the sequence of audio samples collected closest to a time estimated by electronic digital hardware or software logic in the recording device to be the time of transmitting the start track recording signal by the master.

15. The method of claim 14, wherein the time estimated is the time that the audio slave receives the signal to start audio track recording from the master.

16. The method of claim 14, wherein the time estimated is the time that the audio slave receives the signal to start audio track recording from the master, corrected for travel time of the signal from the master to the slave.

17. The method of claim 1, further comprising:
    i) storing in electronic storage, by a particular device in the audio recording set, an indicator of the time offset between the time of the initial audio sample of the particular device and the time of transmitting the signal to start track recording.

18. The method of claim 17, wherein the indicator of time offset is either
    (i) the difference between an estimate of the time of transmitting the signal to start track recording and the time of the initial audio sample of the particular device, or
    (ii) the time of the initial audio sample of the particular device, and wherein a device stores the time at which the signal to start recording was transmitted to electronic storage.

19. The method of claim 17, further comprising:

j) interpolating using logic in digital electronic hardware or software a subset of the sequence of audio samples of a particular device to obtain a constructed audio sample corresponding to a time t, where t=T+nI, T is the time of transmission of the start recording signal, I is the sampling interval, and n is an integer.

20. An apparatus for creating a multitrack audio recording, comprising:

a) a plurality of handheld digital electronic devices;

b) electronic digital hardware or software logic in a particular handheld digital electronic device adapted to establishing that device to be a master upon receipt of a command, and a command establishing that device to be a master;

c) electronic digital hardware or software logic in at least one particular handheld digital electronic device adapted to establishing that device to be an audio slave upon receipt of a command, and respective commands establishing those devices to be audio slaves;

d) a respective digital storage unit associated with each device in an audio recording set that contains at least two devices taken from a set that includes the master and the audio slaves;

e) a respective sequence of audio samples collected at a constant uniform sampling interval by each device in the audio recording set on its digital storage unit;

f) a communication system, adapted to transmission of signals by the master and receipt of signals by the audio slaves;

g) a signal transmitted by the master over the communication system and received by the slaves to start audio track recording; and h) for each device in the audio recording set, a respective initial audio sample selected from its sequence of audio samples for an audio track corresponding to that device, the selection being based upon the time of transmitting the signal to start track recording.

21. The apparatus of claim 20, further comprising:

i) electronic digital hardware or software logic in zero or more digital electronic devices adapted to establishing those devices to be video slaves upon receipt of a command, and respective commands establishing those devices to be video slaves;

j) a respective digital storage unit associated with each device in a video recording set, the set containing at least one device taken from a set that includes the master and the video slaves, if any;

k) for each device in the video recording set, a video track saved in the digital storage unit of the device, each video track having a first frame that is selected based upon an estimate of the time of transmitting the signal to start track recording.

22. The apparatus of claim 21, wherein the video recording set includes two video slaves.

23. The apparatus of claim 20, wherein the audio recording set includes two audio slaves.

24. The method of claim 23, wherein the audio recording set includes the master.

25. The apparatus of claim 20, further comprising a respective audio input device corresponding to each device in the audio recording set, wherein the audio input device is an integrated microphone, an external microphone, or other external electronic device adapted to communication with that recording device.

26. The apparatus of claim 20, further comprising:

i) a command to transmit the signal to start track recording issued to the master through electronic digital hardware or software in the master.

27. The apparatus of claim 26, further comprising:

j) a command to transmit a signal to stop track recording signal issued to the master through electronic digital hardware or software in the master;

k) a signal transmitted by the master over the communication system and received by the audio slaves to stop track recording;

l) for each device in the audio recording set, an audio track saved in the digital storage unit of the device, each audio track having a final sample that is selected based upon an estimate of the time of transmitting the signal to stop track recording, the track including all audio samples collected between the initial and the final sample of the track.

28. The apparatus of claim 26, wherein a respective graphical user interface contained within a particular handheld digital electronic device is adapted to establishing that device as an audio slave or as a master, and the master contains a user record control adapted to commanding the master to issue the signal to start track recording.

29. The apparatus of claim 20, wherein the communication system is wireless.

30. The apparatus of claim 20, wherein receipt by a handheld digital electronic device of a command establishing the device as be a slave causes that device to begin collecting its sequence of audio samples and, if the master is in the audio recording set, receipt by a handheld digital electronic device of a command establishing the device to be the master causes that device to begin collecting its sequence of audio samples.

31. The apparatus of claim 30, further comprising:

i) a circular buffer into which audio samples collected by a handheld digital electronic device in the audio recording set are placed before the master transmits the signal to start track recording.

32. The apparatus of claim 20, wherein at least one of the handheld digital electronic devices in the audio recording set is a portable digital audio player.

33. The apparatus of claim 20, wherein the respective initial audio sample is selected to be a sample in the sequence of audio samples collected closest to a time estimated by electronic digital hardware or software logic in the recording device to be the time of transmitting the start track recording signal by the master.

34. The apparatus of claim 33, wherein the time estimated by a particular slave is the time that the slave receives the signal to start audio track recording from the master.

35. The apparatus of claim 33, wherein the time estimated by a particular slave is the time that the slave receives the signal to start audio track recording from the master, corrected for travel time of the signal to start audio track recording from the master to the slave.

36. The apparatus of claim 20, further comprising:

i) an indicator of the time offset between the time of the initial audio sample of the particular device and the time of transmitting the signal to start track recording, said indicator stored in electronic storage by a particular device in the audio recording set.

37. The apparatus of claim 36, wherein the indicator of time offset is either (i) the difference between the time of transmitting the signal to start track recording and the time of the initial audio sample of the particular device, or (ii) the time of the initial audio sample of the particular device, and wherein a device stores the time at which the signal to start recording was transmitted to electronic storage.

38. The apparatus of claim 36, further comprising:

j) a constructed audio sample, obtained by interpolating using logic in digital electronic hardware or software a subset of the sequence of audio samples of a particular device, the constructed audio sample corresponding to a time t, where $t=T+nI$, T is the time of transmission of the start recording signal, I is the sampling interval, and n is an integer.

* * * * *